United States Patent
Korus

(10) Patent No.: US 11,510,372 B2
(45) Date of Patent: Nov. 29, 2022

(54) SELF-LEVELING MOBILE TOWER FOR USE WITH AN IRRIGATION SYSTEM

(71) Applicant: LINDSAY CORPORATION, Omaha, NE (US)

(72) Inventor: Thomas J. Korus, Lindsay, NE (US)

(73) Assignee: LINDSAY CORPORATION, Omaha, NE (US)

( * ) Notice: Subject to any disclaimer, the term of this patent is extended or adjusted under 35 U.S.C. 154(b) by 616 days.

(21) Appl. No.: 16/559,718

(22) Filed: Sep. 4, 2019

(65) Prior Publication Data
US 2021/0059132 A1  Mar. 4, 2021

(51) Int. Cl.
*A01G 25/09* (2006.01)
*B60G 3/01* (2006.01)
*B60K 7/00* (2006.01)

(52) U.S. Cl.
CPC .............. *A01G 25/09* (2013.01); *B60G 3/01* (2013.01); *B60K 7/00* (2013.01); *B60K 7/0007* (2013.01); *B60K 2007/0076* (2013.01)

(58) Field of Classification Search
CPC ........ A01G 25/09; A01G 25/092; B60K 7/00; B60K 7/0007; B60K 2007/0076; B60G 3/01; B60G 1/00; B60G 2300/08; B60G 17/0165; B60G 2300/50; B60G 2400/0511; B60G 2400/841; B60G 2500/30; B60G 2800/012
See application file for complete search history.

(56) References Cited

U.S. PATENT DOCUMENTS

| 4,549,694 | A |   | 10/1985 | Davis et al. |
| 5,246,164 | A | * | 9/1993 | McCann ................. A01G 25/16 239/11 |
| 6,131,833 | A | * | 10/2000 | Chapman ............. A01G 25/092 305/128 |
| 7,229,032 | B1 | * | 6/2007 | Christensen ......... A01G 25/092 239/744 |
| 7,311,275 | B2 |   | 12/2007 | Korus |
| 7,938,343 | B2 | * | 5/2011 | Vorderstrasse ....... A01G 25/092 239/722 |
| 8,442,722 | B2 |   | 5/2013 | Grabow et al. |
| 9,545,063 | B1 | * | 1/2017 | Kastl ..................... A01G 25/092 |
| 9,683,680 | B1 | * | 6/2017 | Korus ....................... F16L 3/12 |
| 2003/0029943 | A1 | * | 2/2003 | Malsam ............... A01G 25/092 239/722 |

(Continued)

*Primary Examiner* — Mussa A Shaawat
(74) *Attorney, Agent, or Firm* — Hovey Williams LLP

(57) ABSTRACT

A mobile tower for use with an irrigation system comprises a frame, first and second spindles, a first height adjustment assembly, and a second height adjustment assembly. The frame is configured to support a fluid-carrying conduit of the irrigation system. The first and second spindles each include a generally upright beam. The first height adjustment assembly is rigidly connected to a first side of the frame and movably coupled to the first spindle. The first height adjustment assembly includes a first mechanism configured to raise or lower the first side of the frame relative to the first spindle. The second height adjustment assembly is rigidly connected to a second side of the frame and movably coupled to the second spindle. The second height adjustment assembly includes a second mechanism configured to raise or lower the second side of the frame relative to the second spindle.

20 Claims, 14 Drawing Sheets

(56) References Cited

U.S. PATENT DOCUMENTS

| | | | |
|---|---|---|---|
| 2006/0011753 A1* | 1/2006 | Sinden | A01G 25/097 239/722 |
| 2008/0046130 A1* | 2/2008 | Faivre | A01G 25/092 239/728 |
| 2011/0248104 A1* | 10/2011 | Malsam | A01G 25/092 239/723 |
| 2012/0305682 A1* | 12/2012 | Korus | A01G 25/097 239/731 |
| 2013/0284861 A1* | 10/2013 | Korus | B60B 25/002 152/5 |
| 2016/0014982 A1* | 1/2016 | Malsam | A01G 25/092 239/73 |
| 2018/0066788 A1* | 3/2018 | Korus | F16L 55/1652 |
| 2019/0170287 A1* | 6/2019 | Fredenburg | F16L 23/02 |
| 2019/0297799 A1* | 10/2019 | LaRue | A01G 25/092 |
| 2021/0112724 A1* | 4/2021 | Munson | A01G 25/09 |

\* cited by examiner

SELF-LEVELING MOBILE TOWER FOR USE WITH AN IRRIGATION SYSTEM

FIELD OF THE INVENTION

Embodiments of the current invention relate to mobile towers that operate in an irrigation system, such as a center pivot irrigation system.

DESCRIPTION OF THE RELATED ART

Irrigation systems, such as a center pivot irrigation system, typically include a fixed central pivot that is coupled to a plurality of radially outward extending spans. The central pivot includes a mobile tower or other structure that is capable of rotating and supporting a fluid-carrying conduit or pipe. Each span includes a mobile tower and a truss structure. The mobile tower includes a motor drive which moves the mobile tower forward or backward. The truss structure couples the mobile tower of one span to the mobile tower of another span and supports the conduit. The truss structure may also support a plurality of hoses and sprayers coupled to the conduit. The irrigation system is positioned within a field of crops. During operation, the motor drives propel the mobile towers to move the conduit in a circle around the center pivot while the sprayers deliver fluid to the crops.

The irrigation system typically encounters a variety of environmental conditions and weather scenarios. The terrain may be uneven so that a forward portion of one or more mobile towers may be at a different height from a rear portion of one or more mobile towers, resulting in the mobile towers being unlevel. Unlevel mobile towers may cause potentially damaging stresses on the conduit and truss structures. High wind events can occur during storms or other inclement weather scenarios—potentially causing the mobile towers to topple over or be moved into a position that is not easily corrected. In addition, crops that grow to different heights may be planted within the same field—requiring adjustments of the vertical position of the sprayers to maintain an optimum distance from the crops. All of these situations present challenges to the successful and uninterrupted operation of the irrigation system.

SUMMARY OF THE INVENTION

Embodiments of the current invention provide a mobile tower for use with an irrigation system that is capable of leveling itself in order to reduce stresses on the irrigation system conduit as the mobile tower encounters hilly or uneven terrain. The mobile tower is also capable of lowering the conduit and other components to reduce the center of gravity and profile of the irrigation system during high wind events or other incidents that may lead to tipping the mobile tower over. The mobile tower is further capable of controlling the height of irrigation hoses and sprayers so as to maintain an optimum distance from the crops for irrigation.

The mobile tower broadly comprises a frame, first and second spindles, a first height adjustment assembly, and a second height adjustment assembly. The frame is configured to support a fluid-carrying conduit of the irrigation system. The first and second spindles each include a generally upright beam. The first height adjustment assembly is rigidly connected to a first side of the frame and movably coupled to the first spindle. The first height adjustment assembly includes a first mechanism configured to raise or lower the first side of the frame relative to the first spindle. The second height adjustment assembly is rigidly connected to a second side of the frame and movably coupled to the second spindle. The second height adjustment assembly includes a second mechanism configured to raise or lower the second side of the frame relative to the second spindle.

Another embodiment of the current invention provides a mobile tower for use with an irrigation system. The mobile tower comprises a frame, first and second spindles, a first height adjustment assembly, a second height adjustment assembly, and a controller. The frame is configured to support a fluid-carrying conduit of the irrigation system. The first and second spindles each include a generally upright beam. The first height adjustment assembly is rigidly connected to a first side of the frame and movably coupled to the first spindle. The first height adjustment assembly includes a first mechanism configured to raise or lower the first side of the frame relative to the first spindle. The second height adjustment assembly is rigidly connected to a second side of the frame and movably coupled to the second spindle. The second height adjustment assembly includes a second mechanism configured to raise or lower the second side of the frame relative to the second spindle. The controller is programmed or configured to receive sensor data that indicates a tilt angle of the frame, and control the first and second height assemblies to raise or lower the first or second sides of the frame to maintain the tilt angle to be within a range of values.

Yet another embodiment of the current invention provides an irrigation system comprising a central pivot, a fluid-carrying conduit, and a plurality of spans. The central pivot includes a support structure. The conduit is supported by the central pivot and coupled to a fluid source. The spans are interconnected and extend radially outward from the pivot. Each span includes a plurality of fluid distribution members, a truss structure, and a mobile tower. The fluid distribution members are coupled to the conduit and configured to distribute fluid. The truss structure supports the conduit and the fluid distribution members. The mobile tower is connected to the truss structure and supports the conduit. The mobile tower includes a frame, first and second spindles, a first height adjustment assembly, and a second height adjustment assembly. The frame is configured to support a fluid-carrying conduit of the irrigation system. The first and second spindles each include a generally upright beam. The first height adjustment assembly is rigidly connected to a first side of the frame and movably coupled to the first spindle. The first height adjustment assembly includes a first mechanism configured to raise or lower the first side of the frame relative to the first spindle. The second height adjustment assembly is rigidly connected to a second side of the frame and movably coupled to the second spindle. The second height adjustment assembly includes a second mechanism configured to raise or lower the second side of the frame relative to the second spindle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
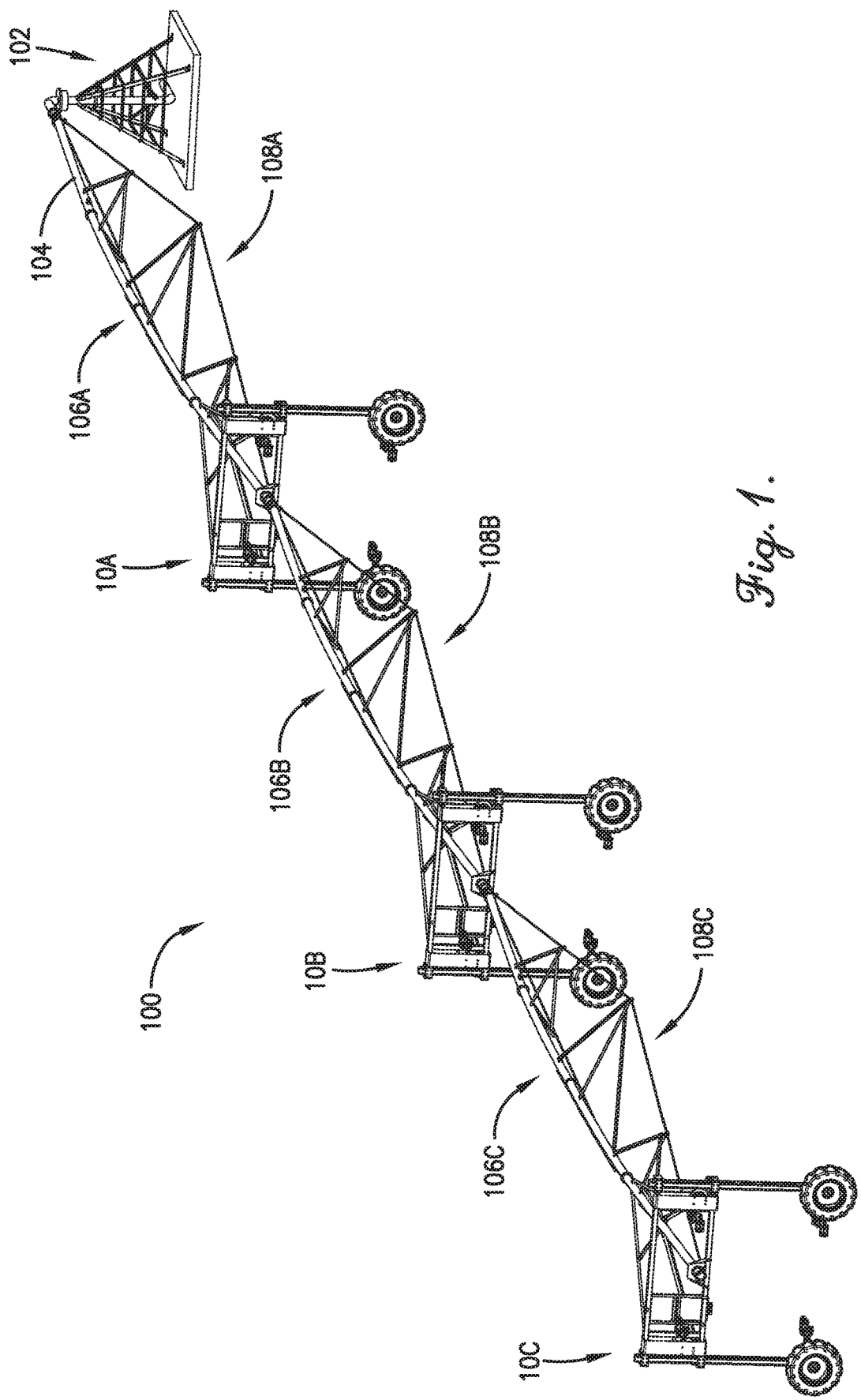
FIG. 1 is a perspective environmental view of an irrigation system which utilizes a plurality of self-leveling mobile towers, constructed in accordance with various embodiments of the current invention.
Figure 2:
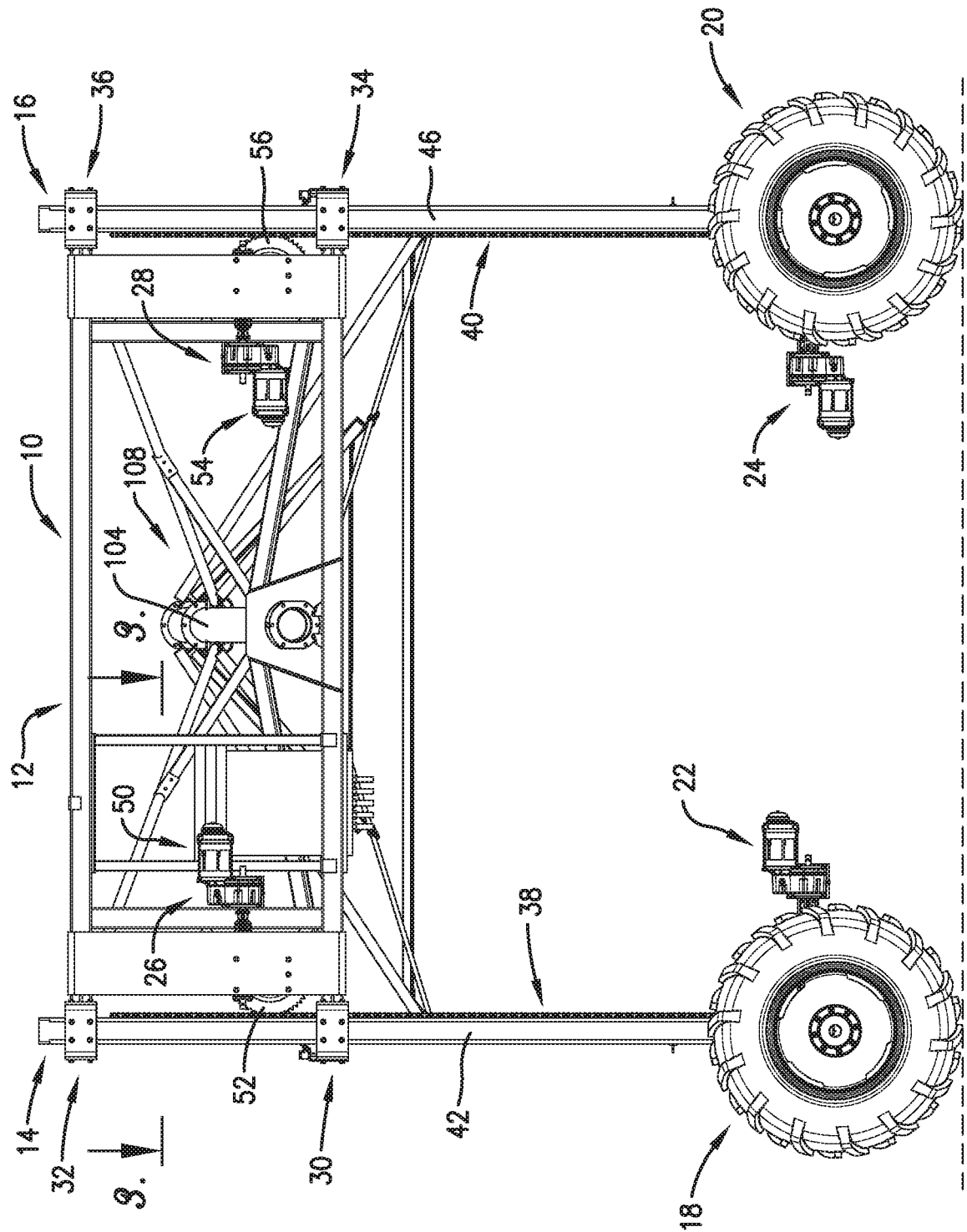
FIG. 2 is a front view of one of the mobile towers including a frame, first and second spindles, first and second height adjustment assemblies, first, second, third, and fourth roller cages, first and second drive motors, and first and second wheels.
Figure 3:
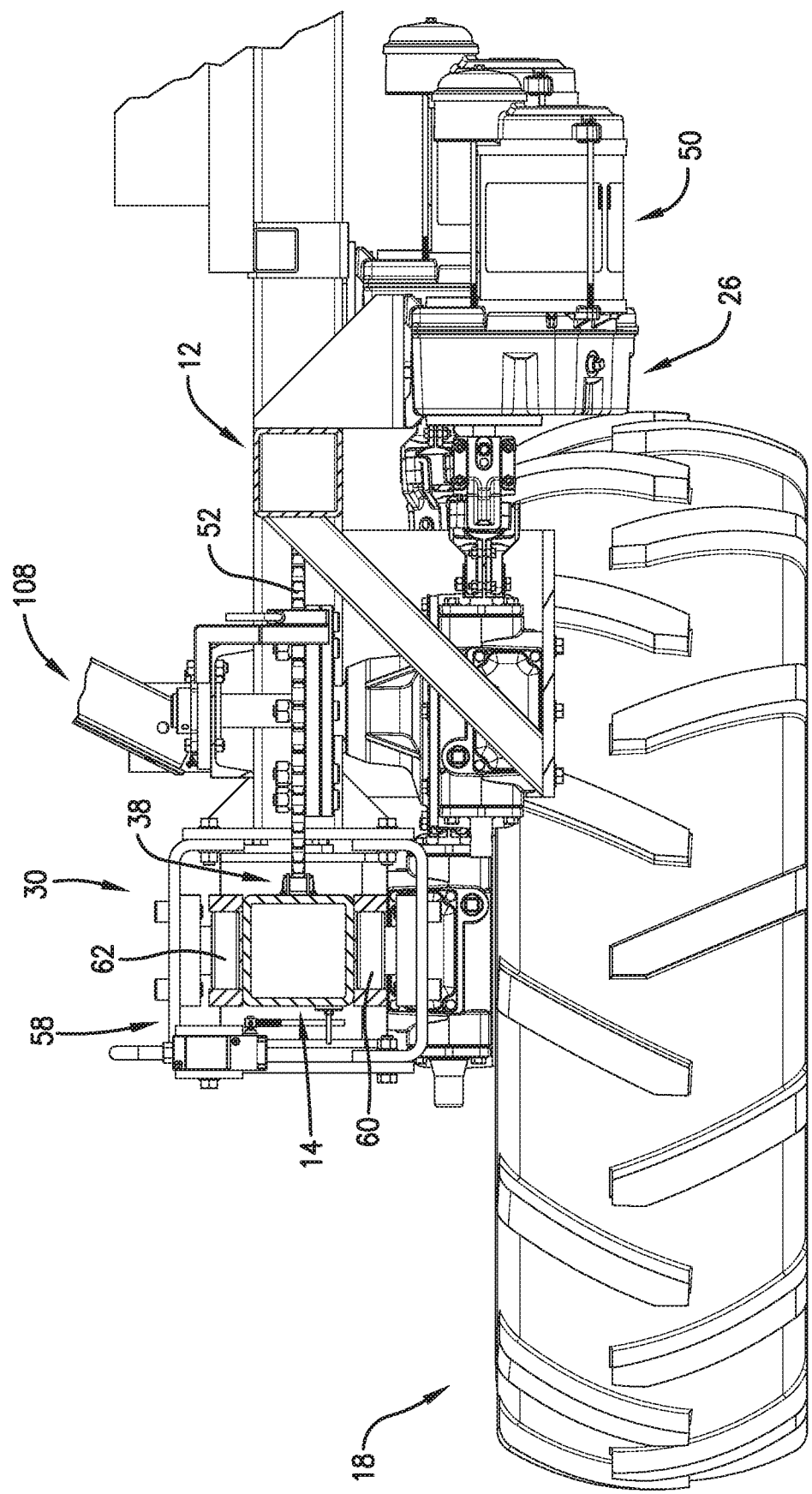
FIG. 3 is a top view of the first spindle, the first height adjustment assembly, the first roller cage, the first drive motor, and the first wheel.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

A mobile tower 10, constructed in accordance with various embodiments of the current invention, for use with an irrigation system 100 is shown in FIGS. 1-14. The mobile tower 10 is capable of self-leveling to reduce or prevent unwanted stresses on the components of the irrigation system 100. The mobile tower 10 is further capable of raising or lowering other components of the irrigation system 100 to improve operation and reduce or prevent potential damage from inclement weather.

An exemplary embodiment of the irrigation system 100, shown in FIG. 1, includes a central pivot irrigation system and broadly comprises a fixed central pivot 102, a conduit 104, and a plurality of interconnected radially outward extending spans 106A, 106B, 106C pivotally connected to the central pivot 102. The irrigation system 100 may also comprise an extension arm (also commonly referred to as a "swing arm" or "corner arm") pivotally connected to a free end of the outermost span 106C. The irrigation system 100 may further comprise a main controller that controls the overall operation of the system along with communication elements that provide wireless or wired communication with external electronic devices or systems. The irrigation system 100 may also be embodied by a lateral, or linear, move apparatus without departing from the scope of the current invention.

The fixed central pivot 102 may be a mobile tower or any other support structure about which the spans 106 may pivot. The central pivot has access to a fluid source, such as a well, water tank, or other source of water, and may also be coupled with a tank or other source of agricultural products to inject fertilizers, pesticides and/or other chemicals into the fluid for application during irrigation.

The conduit 104 includes a plurality of fluid-carrying tubes coupled to one another to form a continuous fluid-carrying pipe that extends the length of the spans 106. The conduit 104 is supported by the central pivot 102 and receives fluid from the fluid source.

Each span 106A, 106B, 106C includes a truss structure 108A, 108B, 108C and the mobile tower 10A, 10B, 10C. Each span 106A, 106B, 106C may also include a plurality of fluid distribution elements (not shown in the figures). The fluid distribution elements include sprayers, spreaders, sprinklers, diffusers, or the like, each optionally attached to a drop hose. The fluid distribution elements are fluidly coupled to the conduit 104 in order to access and distribute the fluid.

The truss structure 108A, 108B, 108C includes a plurality of beam members coupled to one another to form a load-bearing truss. The truss structure 108A, 108B, 108C supports the conduit 104 and the fluid distribution elements. In addition, the truss structure 108A, 108B, 108C also connects the mobile tower 10 of an outer span 106 to the mobile tower 10 of an inner span 106 or to the central pivot 102.

Each span 106A, 106B, 106C may further include one or more valves coupled to the conduit 104 which control the flow of fluid through the conduit 104. The opening and closing of the valves may be automatically controlled with an electronic signal or digital data from a control system locally integrated with the irrigation system 100 or externally located to provide remote control.

Each mobile tower 10, as shown in FIGS. 1, 2, 6-9, 13, and 14, broadly comprises a frame 12, a first spindle 14, a second spindle 16, a first wheel 18, a second wheel 20, a first drive motor 22, a second drive motor 24, a first height adjustment assembly 26, a second height adjustment assembly 28, a first roller cage 30, a second roller cage 32, a third roller cage 34, and a fourth roller cage 36.

The frame 12, as shown in FIGS. 2, 3, 6-10, and 12-14, includes a plurality of beam members connected to one another to form a structure with a generally rectangular perimeter, although other perimeter shapes or configurations are possible. An exemplary frame 12 includes upper and lower horizontal beams that are spaced apart from one another and left and right vertical beams that are spaced apart from one another and positioned in between the horizontal beams. The beams of the frame 12 may be formed from rigid materials, such as metals or metal alloys. The truss structure 108 of one span 106 is connected to the frame 12. In addition, the conduit 104 is supported by (the lower horizontal beam of) the frame 12.

The first spindle 14, as shown in FIGS. 2, 3, 6-11, 13, and 14, includes an elongated beam that is generally upright or vertically oriented. The beam includes four side walls connected together to form a square or rectangular cross section, with first and third side walls opposing one another and second and fourth side walls opposing one another. The first spindle 14 also includes a first plurality of interlocking elements 38 positioned along the length of the first side wall. Each interlocking element 38 includes a tooth, a link of a chain, a groove, or other component to which another object can be retained, latched, or locked. An exemplary embodiment of the first interlocking elements 38 includes an unlooped chain, such as a roller chain or a block chain, formed from metal or metal alloys that is rigidly attached along the length of the first side wall, with a first end of the chain attached near the bottom of the first spindle 14 and a second, opposing end attached near the top of the first spindle 14. In addition, the first spindle 14 includes a first groove 42 or channel and a second groove 44 or channel. The first groove 42 is formed or positioned along the length of the second side wall, while the second groove 44 is formed or positioned along the length of the fourth side wall. The first spindle 14 is coupled to a first side of the frame 12.

The second spindle 16, as shown in FIGS. 2, 6-10, and 12-14, is substantially similar to the first spindle 14 in structure and includes a second plurality of interlocking elements 40 positioned along the length of the first side wall. The second spindle 16 also includes a third groove 46 formed or positioned along the length of the second side wall and a fourth groove 48 is formed or positioned along the length of the fourth side wall. The second spindle 16 is coupled to a second side of the frame 12.

The first wheel 18, as shown in FIGS. 2, 3, 6-11, 13, and 14, may include single or multiple wheel and treaded tire combinations, an airless flexible tire, a track belt assembly, or the like. An exemplary embodiment of the first wheel 18 includes a single wheel and treaded tire combination. The first wheel 18 is connected to one end (a lower end) of the first spindle 14.

The second wheel 20, as shown in FIGS. 2, 3, 6-11, 13, and 14, is substantially similar to the first wheel 18 in structure and is connected to one end (a lower end) of the second spindle 16.

The first drive motor 22, as shown in FIGS. 2, 3, 6-11, 13, and 14, includes an electric motor, such as an alternating current (AC) motor or a direct current (DC) motor. The operation of the first drive motor 22 may be controlled by a variable frequency drive (VFD) motor controller. The first drive motor 22 rotates the first wheel 18 and also includes a rotating output shaft which may directly drive the first wheel 18 or may drive the first wheel 18 through a chain drive or a belt drive. An exemplary embodiment of the first drive motor 22 includes a center drive motor and gearbox combination coupled to the first wheel 18 to rotate it.

The second drive motor 24, as shown in FIGS. 2, 3, 6-11, 13, and 14, is substantially similar to the first drive motor 22 in structure and is coupled to the second wheel 20 to rotate it.

The main controller may control the operation of the first drive motor 22 and the second drive motor 24, including generating electronic signals that instruct, energize, or control the first drive motor 22 and the second drive motor 24 to rotate in order to propel each mobile tower 10 and, in turn, the irrigation system 100 to follow an irrigation path through the crops to be irrigated.

The first height adjustment assembly 26, as shown in FIGS. 2, 3, 6-11, 13, and 14, generally raises and lowers the frame 12, or at least the first side of the frame 12, with respect to the first spindle 14. The first height adjustment assembly 26 includes a third drive motor 50 and a first sprocket 52. The third drive motor 50 rotates the first sprocket 52 and includes an AC motor or a DC motor with a rotating output shaft which may directly drive the first sprocket 52 or may drive the first sprocket 52 through a chain drive or a belt drive. The operation of the third drive motor 50 may be controlled by a VFD motor controller. An exemplary embodiment of the third drive motor 50 includes a center drive motor and gearbox combination coupled to the first sprocket 52 to rotate it.

Figure 10:
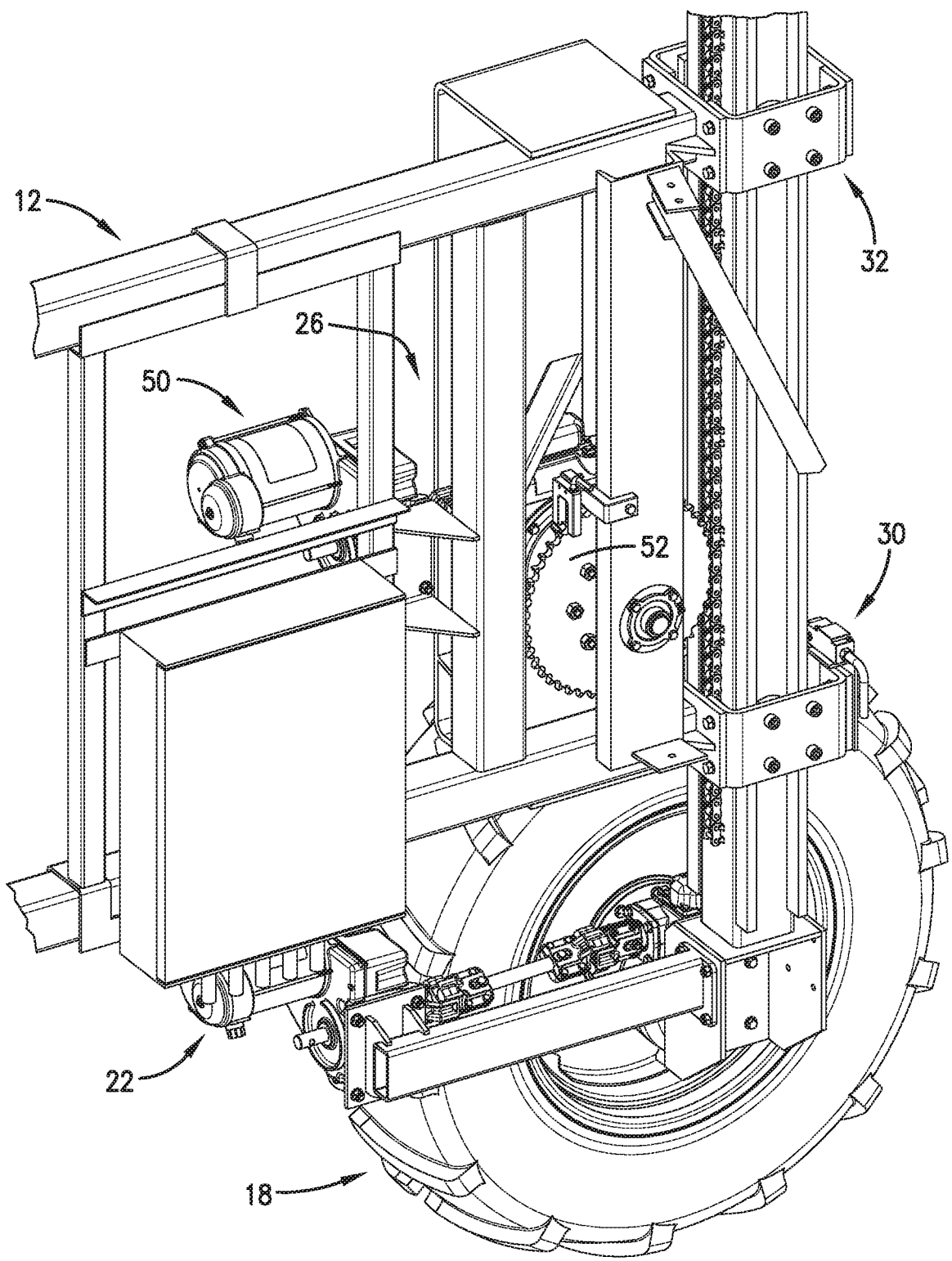
FIG. 10 is a rear perspective view of the first height adjustment assembly in isolation.
Figure 11:
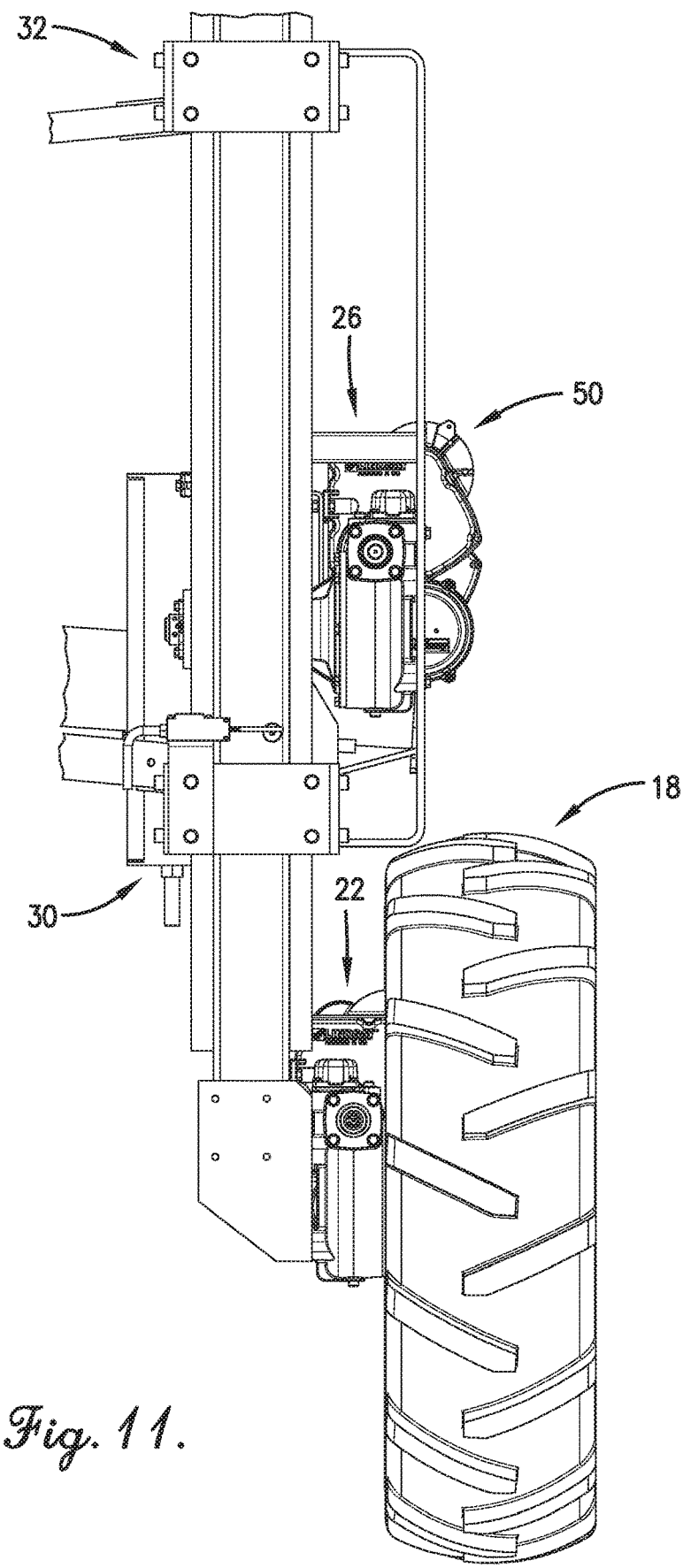
FIG. 11 is a left side view of the first height adjustment assembly in isolation.
Figure 12:
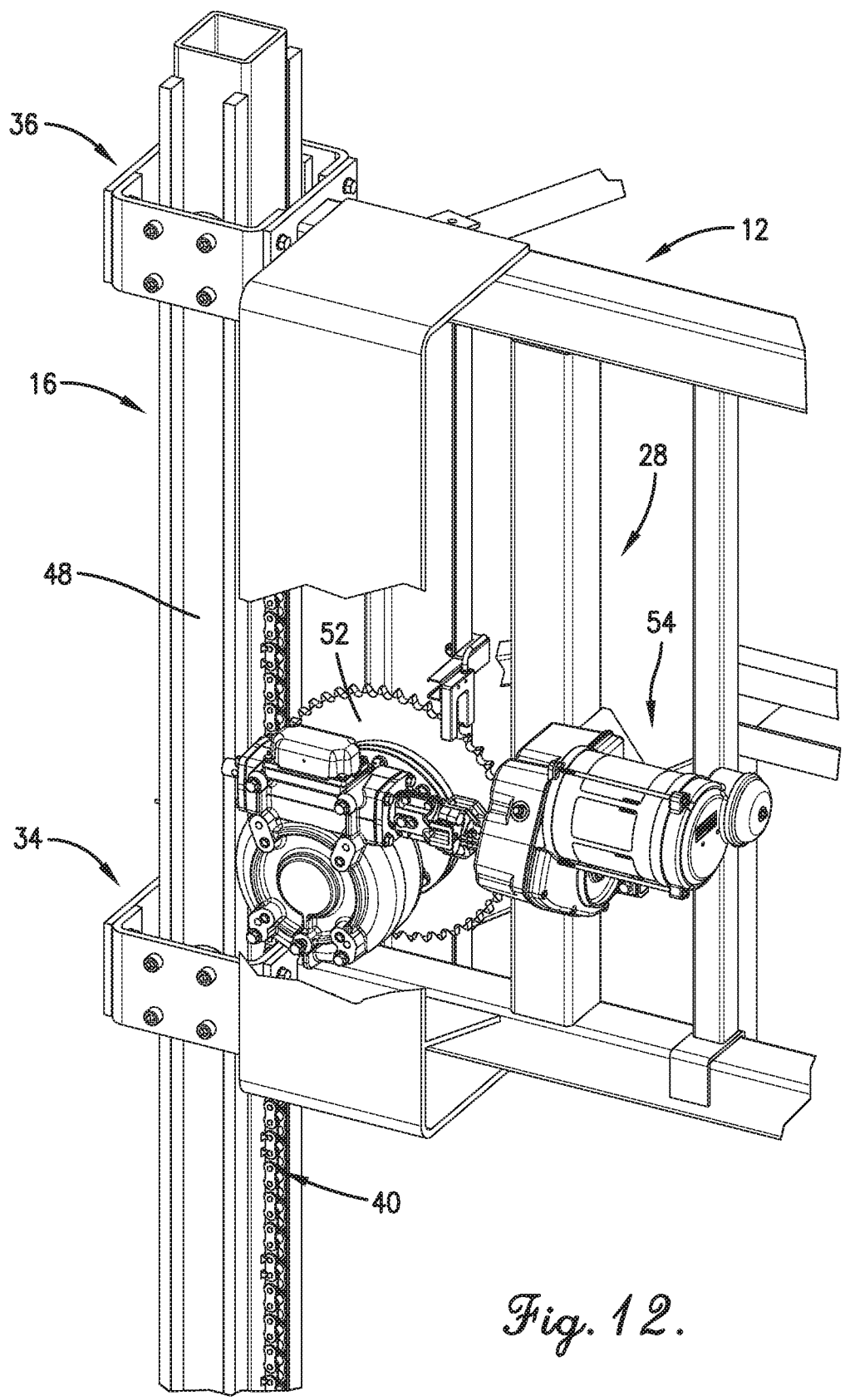
FIG. 12 is a rear perspective view of the second height adjustment assembly in isolation.
Figure 13:
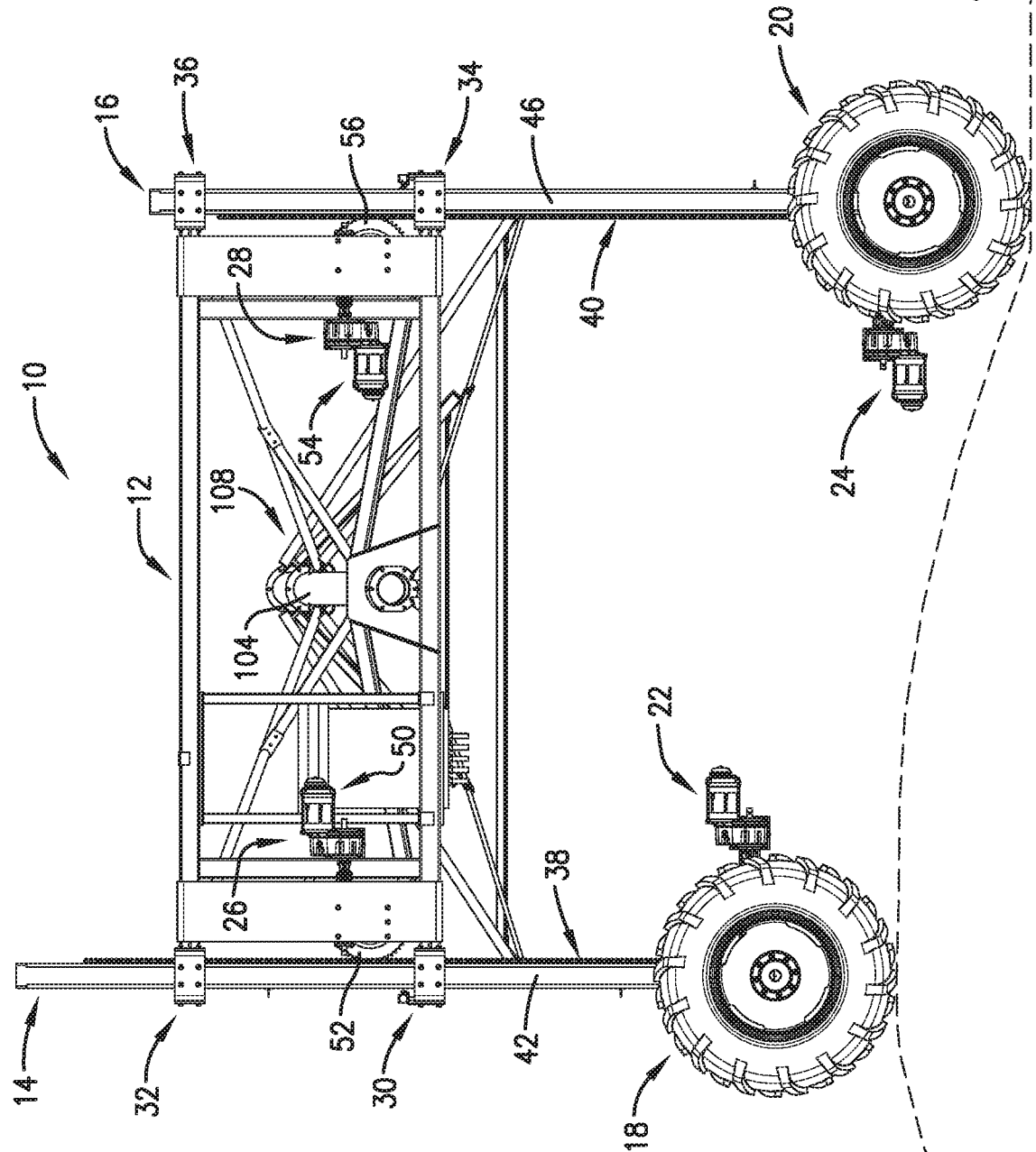
FIG. 13 is a front view of the mobile tower traversing up a hill and maintaining the frame in a level position.
Figure 14:
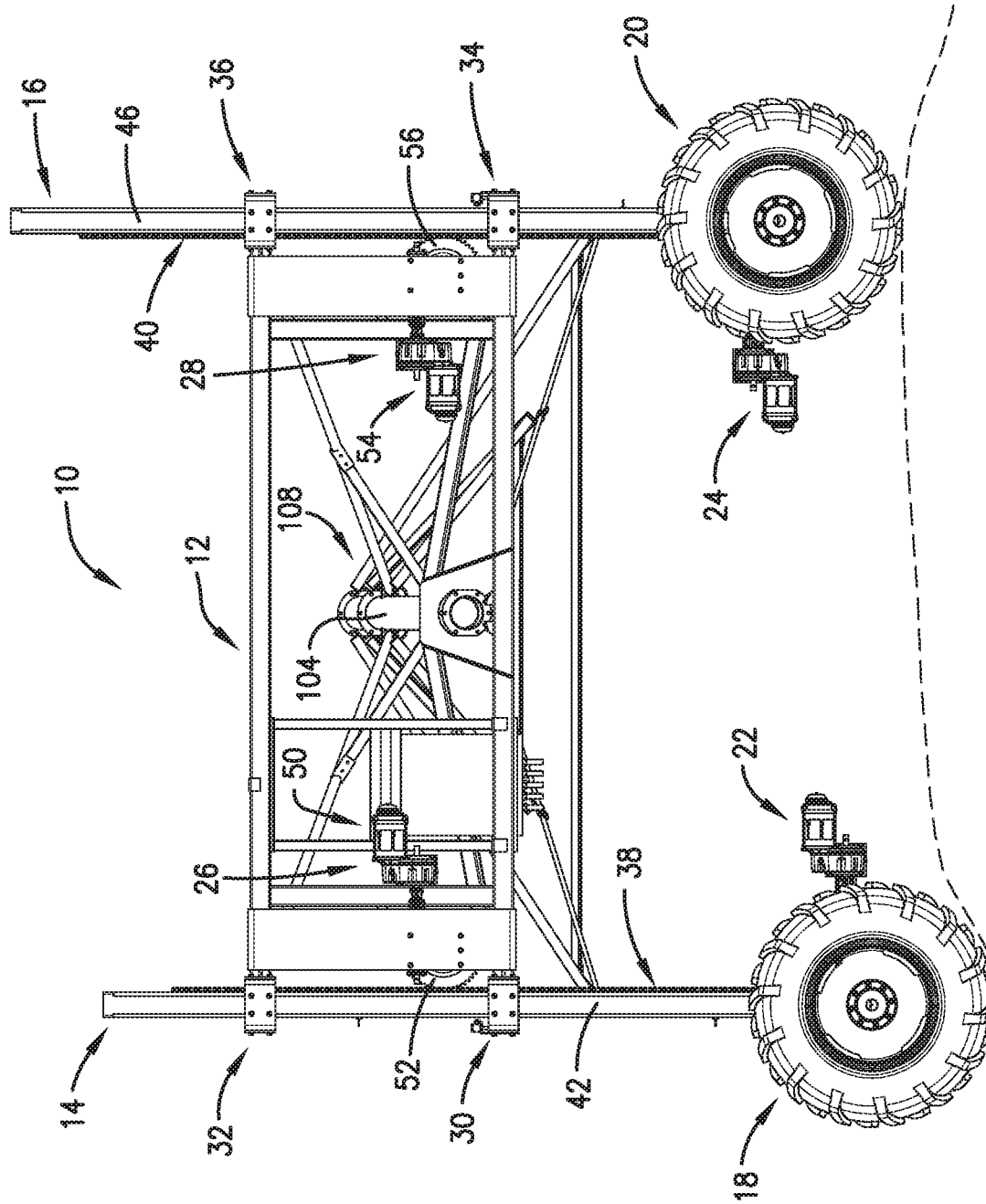
FIG. 14 is a front view of the mobile tower traversing down a hill and maintaining the frame in a level position.

The first sprocket 52, as best shown in FIGS. 10 and 12, includes a profiled wheel with circumferentially-distributed teeth, or cogs. The first sprocket 52 couples with the first interlocking elements 38 on the first spindle 14 such that one or more teeth engage and latch with one or more of the first interlocking elements 38. The first height adjustment assembly 26, and in particular, the first sprocket 52 are coupled to the first side of the frame 12. Thus, when one or more teeth of the first sprocket 52 engage and latch with one or more of the first interlocking elements 38, the first height adjustment assembly 26 and, by extension, the first side of the frame 12 maintain their vertical position with respect to the first spindle 14. The first sprocket 52 is rotated, or driven, by the third drive motor 50. Rotating the first sprocket 52 in a first direction causes one or more teeth to engage and latch with one or more new first interlocking elements 38 that are above the previously engaged and latched first interlocking elements 38, thereby causing the first side of the frame 12 to move upward with respect to the first spindle 14. Rotating the first sprocket 52 in a second direction, opposite to the first, causes one or more teeth to engage and latch with one or more new first interlocking elements 38 that are below the previously engaged and latched first interlocking elements 38, thereby causing the first side of the frame 12 to move downward with respect to the first spindle 14.

The second height adjustment assembly 28, as shown in FIGS. 2, 6-9, and 12-14, is substantially similar to the first height adjustment assembly 26 in structure and includes a fourth drive motor 54 and a second sprocket 56. The second height adjustment assembly 28, and in particular, the second sprocket 56 are coupled to the second side of the frame 12, such that the second sprocket 56 interacts with the second interlocking elements 40 on the second spindle 16. Furthermore, the second sprocket 56 is rotated, or driven, by the fourth drive motor 54. Therefore, rotating the second sprocket 56 in a first direction causes one or more teeth to engage and latch with one or more new second interlocking elements 40 that are above the previously engaged and latched second interlocking elements 40, thereby causing the second side of the frame 12 to move upward with respect to the second spindle 16. Rotating the second sprocket 56 in a second direction, opposite to the first, causes one or more teeth to engage and latch with one or more new second interlocking elements 40 that are below the previously engaged and latched second interlocking elements 40, thereby causing the second side of the frame 12 to move downward with respect to the second spindle 16.

Figure 5:
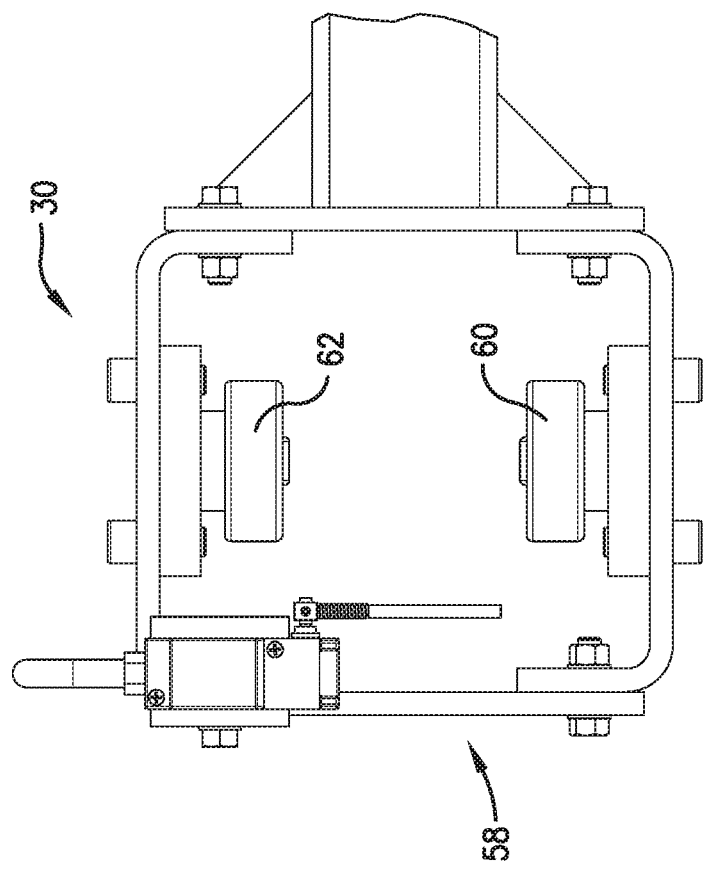
FIG. 5 is a top view of the first roller cage.
Figure 4:
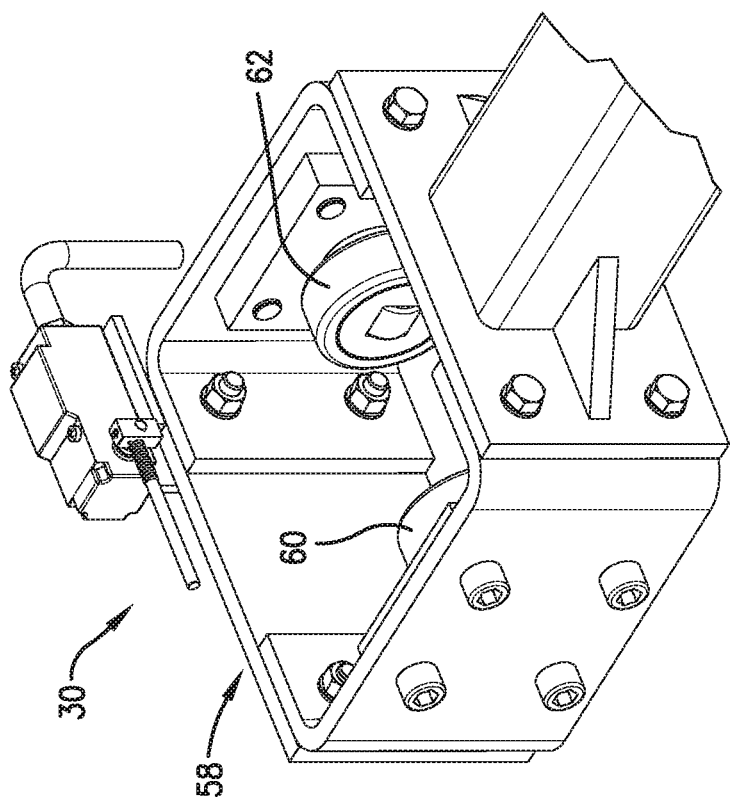
FIG. 4 is an upper perspective view of the first roller cage.
Figure 6:
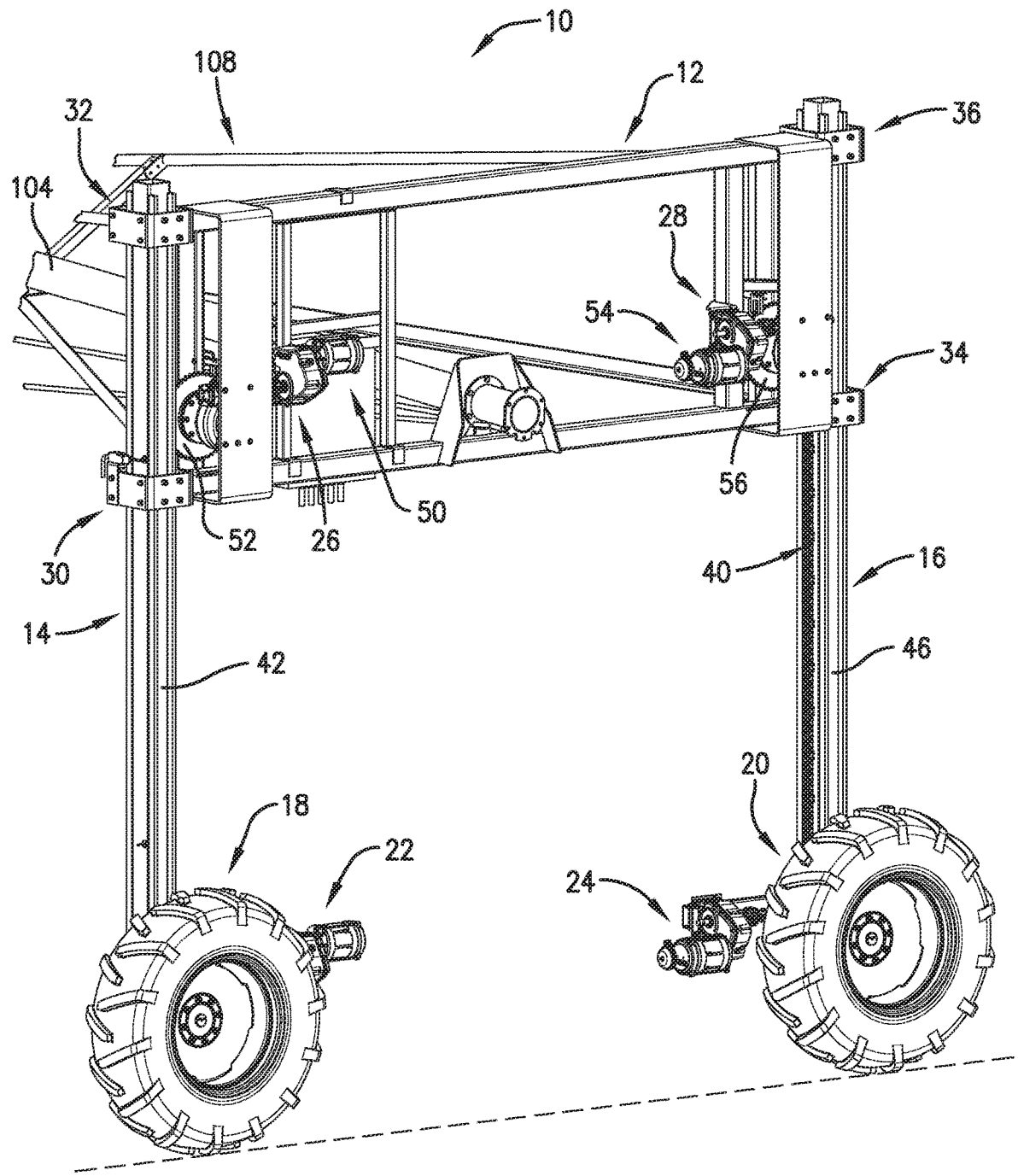
FIG. 6 is a front perspective view of the mobile tower with the frame raised to its upper limit of travel.
Figure 7:
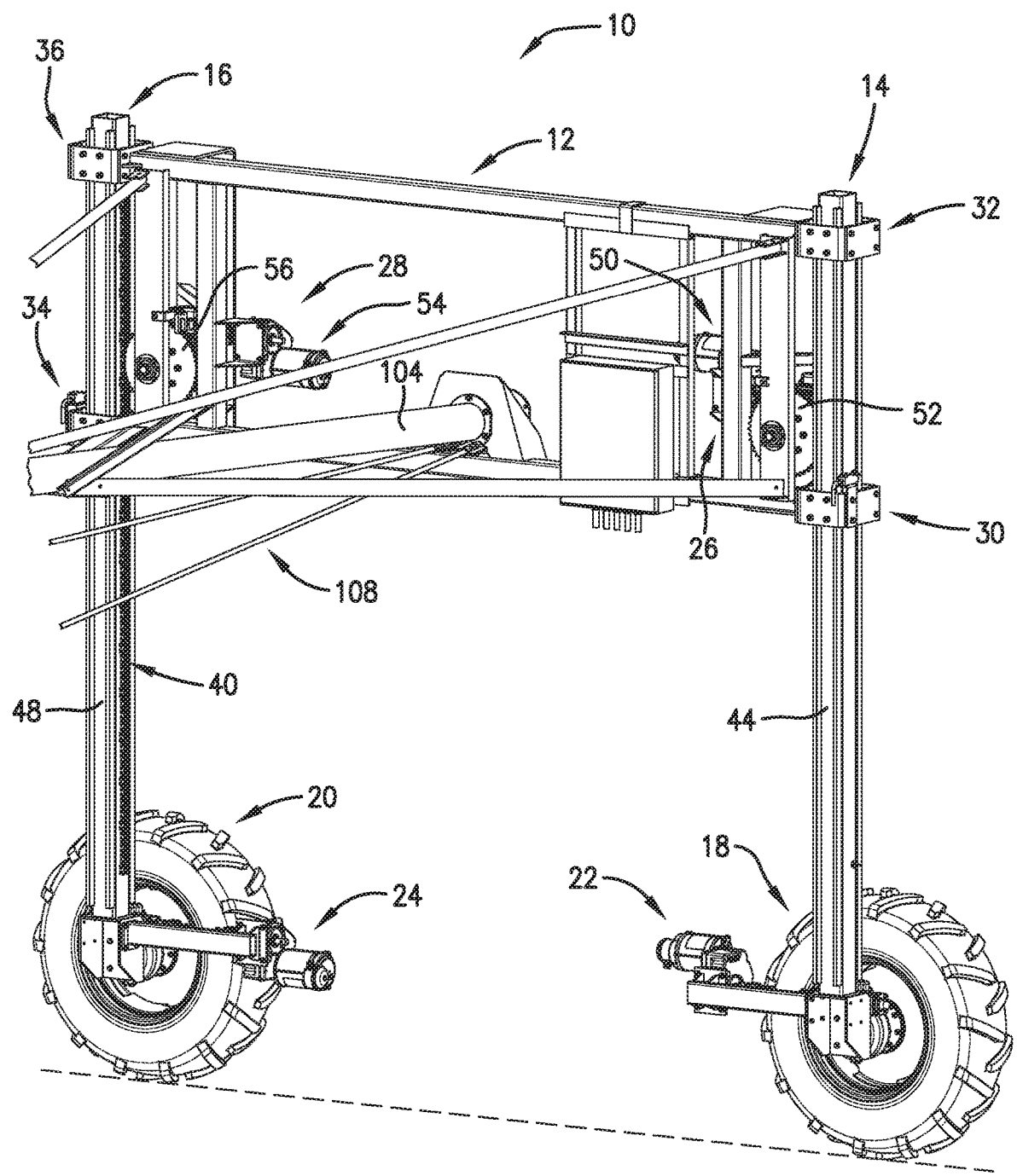
FIG. 7 is a rear perspective view of the mobile tower with the frame raised to its upper limit of travel.
Figure 8:
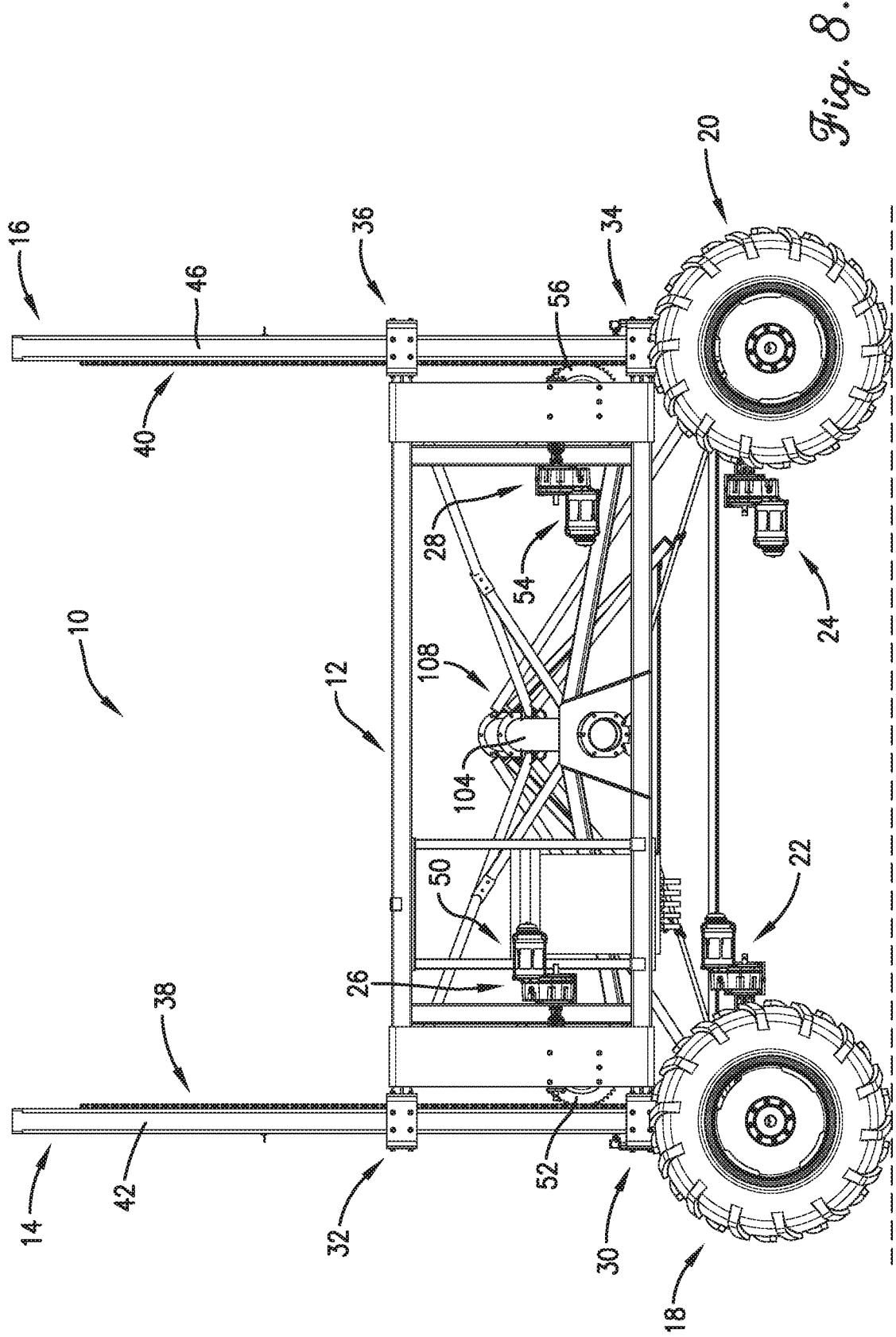
FIG. 8 is a front view of the mobile tower with the frame lowered to its lower limit of travel.
Figure 9:
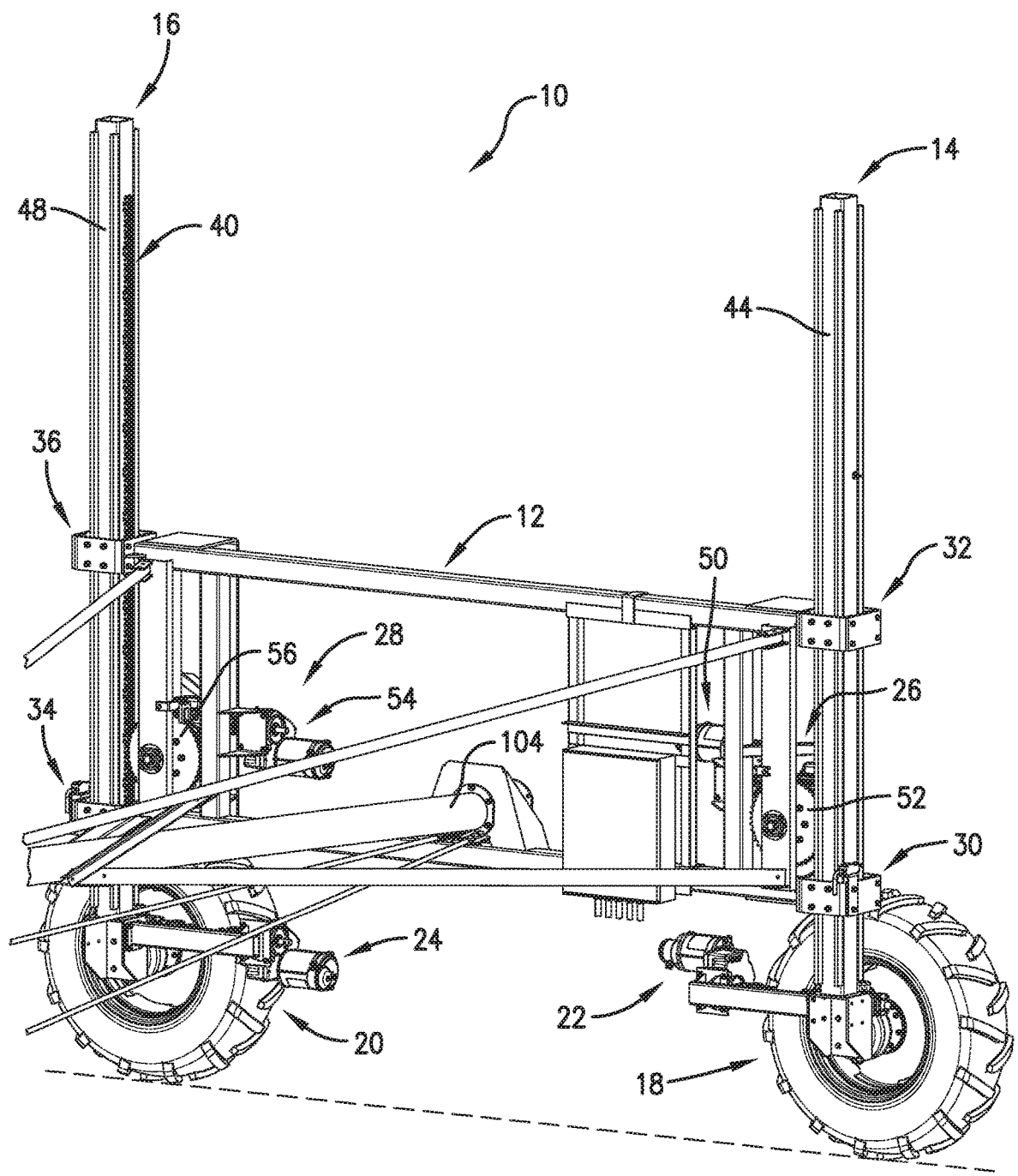
FIG. 9 is a rear perspective view of the mobile tower with the frame lowered to its lower limit of travel.

The first roller cage 30, as best shown in FIGS. 4 and 5, includes a roller housing 58, a first roller 60, and a second roller 62. The roller housing 58 includes four side walls connected to one another to form an open-ended box with a rectangular or square cross-sectional shape. The first roller 60 and the second roller 62 are each disc-shaped bearings. The first roller 60 is connected to one side wall of the roller housing 58, while the second roller 62 is connected to an opposing side wall of the roller housing 58. Each roller 60, 62 can rotate about an axis that is normal to the surface of the side wall to which the roller 60, 62 is connected.

The first roller cage 30 is connected to a lower end of the first side of the frame 12 and is positioned such that the roller housing 58 surrounds the side walls of the first spindle 14. Furthermore, the first roller 60 is positioned in the first groove 42 of the first spindle 14, while the second roller 62 is positioned in the second groove 44. The first roller 60 may contact various portions of the first groove 42 while the frame 12 is moving up or down with respect to the first spindle 14, and the second roller 62 may contact various portions of the second groove 44 while the frame 12 is moving up or down with respect to the first spindle 14.

The second roller cage 32, the third roller cage 34, and the fourth roller cage 36 are each substantially similar to the first roller cage 30 in structure and each includes the same components as the first roller cage 30. The second roller cage 32 is connected to an upper end of the first side of the frame 12 and is positioned such that its housing surrounds the side walls of the first spindle 14—spaced apart from and above the first roller cage 30. The third roller cage 34 is connected to a lower end of the second side of the frame 12 and is positioned such that its housing surrounds the side walls of the second spindle 16, in a similar fashion as the first roller cage 30. The fourth roller cage 36 is connected to an upper end of the second side of the frame 12 and is positioned such that its housing surrounds the side walls of the second spindle 16—spaced apart from and above the third roller cage 34. The roller cages 30, 32, 34, 36 reduce the wobble and other unwanted motion of the first and second spindles 14, 16 while the first and second height adjustment assemblies 26, 28 raise and lower the frame 12, ensuring that the frame 12 raises and lowers smoothly.

The mobile tower 10 may further comprise a plurality of sensors to detect a height and a tilt angle or level of the frame 12. In various embodiments, the mobile tower 10 may include a first sensor operable, or configured, to determine a position of the lower edge of the first side of the frame 12 along the length of the first spindle 14 and a second sensor operable, or configured, to determine a position of the lower edge of the second side of the frame 12 along the length of the second spindle 16. Given the (vertical) position of the lower edge of each side of the frame 12 along its spindle 14, 16 and a radius of each wheel 18, 20, a height above ground of the lower edge of each side of the frame 12 can be determined. Furthermore, the difference in height between the first and second sides of the frame 12 can be calculated which can then be used to calculate the tilt angle of the frame 12—wherein a zero-degree tilt angle indicates that the frame 12 is "level", that is the upper and lower horizontal beams of the frame 12 are flat or parallel to a horizontal plane. A positive tilt angle indicates tilting toward the first side, for example, of the frame 12, that is, the second side of the frame 12 is positioned higher than the first side. A negative tilt angle indicates tilting toward the second side, for example, of the frame 12, that is, the first side of the frame 12 is positioned higher than the second side.

Alternatively, the mobile tower 10 may include one or more sensors, such as infrared radiation or acoustic wave sensors, positioned along a bottom edge of the lower horizontal beam of the frame 12 that detect a distance between the bottom of the frame 12 and the ground. The mobile tower 10 may also include a tilt angle sensor, or inclinometer, positioned somewhere on the frame 12 to determine the tilt angle of the frame 12.

The mobile tower 10 may further comprise a plurality of switches to detect limits of travel for the frame 12 as it moves up and down relative to the first and second spindles 14, 16. For example, the mobile tower 10 may include a whisker switch positioned on each side of the frame 12, such as on one of the roller cages 30, 32, 34, 36, that contact or engage posts positioned on each spindle 14, 16 at upper and lower limits of travel. Alternatively, the mobile tower 10 may include limit or proximity switches positioned at the upper and lower limits of travel on each spindle 14, 16 which may be contacted or engaged by the roller cages 30, 32, 34, 36 as they move up and down on the first and second spindles 14, 16. The switches may generate signals that are used to prevent overtravel of the frame 12 as it moves up and down. The signals may also be used to determine a known position (upper or lower limit of travel) of each side of the frame 12.

Figure 15:
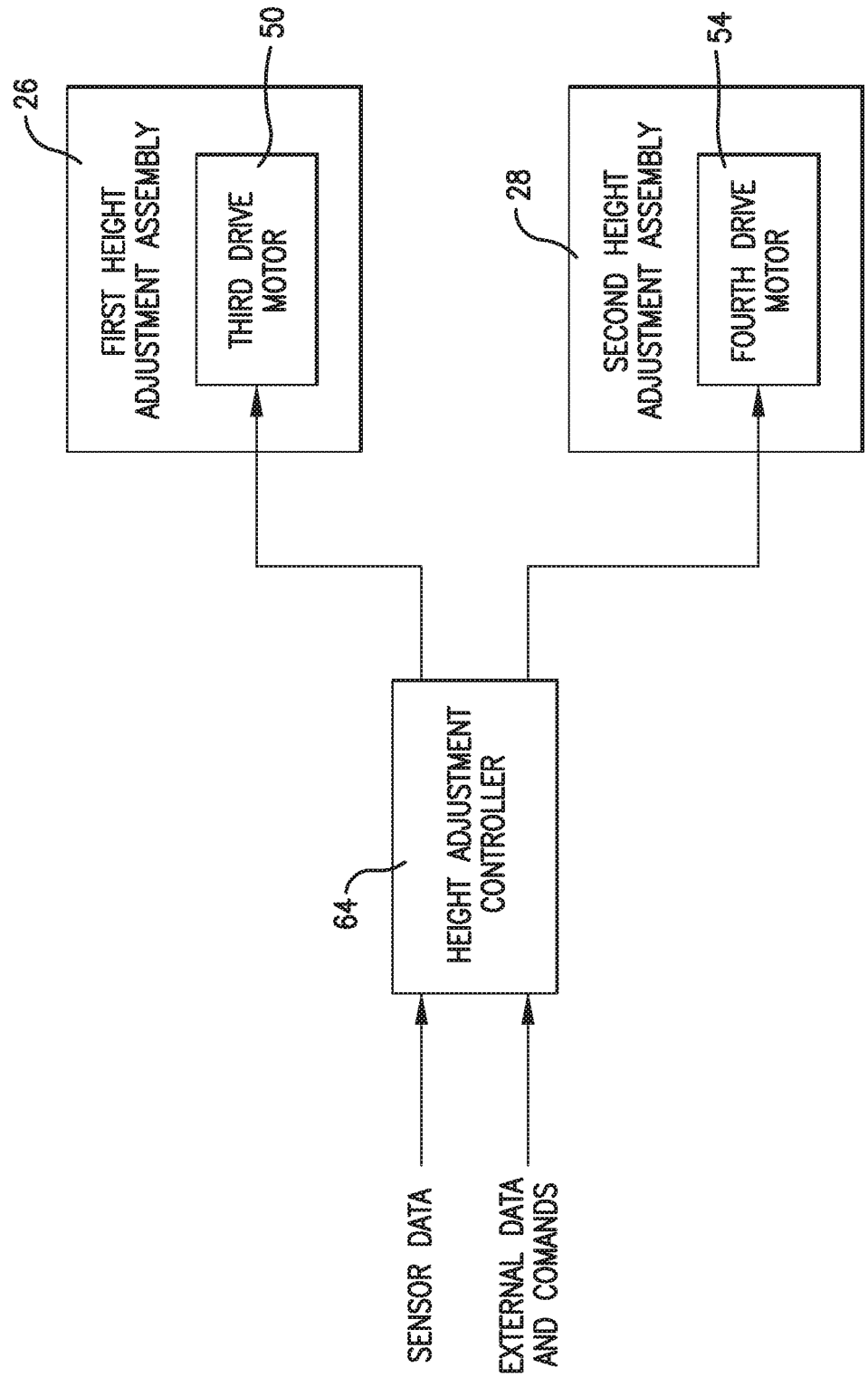
FIG. 15 is a schematic block diagram of a height adjustment controller, the first height adjustment assembly, and the second height adjustment assembly.

Each mobile tower 10 may include a height adjustment controller 64, as shown in FIG. 15, or controlling electronic circuitry that controls the operation of the first and second height adjustment assemblies 26, 28 in order to raise or lower the frame 12 and/or to level the tilt angle. In some embodiments, the irrigation system 100 may include a single height adjustment controller 64 that performs the operations described herein for all of the mobile towers 10. The height adjustment controller 64 may include processors or processing elements such as microprocessors (single-core or multi-core), microcontrollers, digital signal processors (DSPs), field-programmable gate arrays (FPGAs), analog and/or digital application-specific integrated circuits (ASICs), or the like, or combinations thereof. The height adjustment controller 64 may also include electronic circuitry or components that provide feedback control functions such as proportional (P), integral (I), derivative (D), or combinations thereof. In addition, the height adjustment controller 64 may include memory or data storage elements, as well as analog-to-digital converters (ADCs), digital-to-analog converters (DACs), amplifiers, filters, and the like. Furthermore, the height adjustment controller 64 may include or be in electronic communication with communication elements that provide wireless or wired communication in order for the height adjustment controller 64 of one mobile tower 10 to communicate with the height adjustment controllers 64 of other mobile towers 10 or to communicate with external electronic devices or systems.

The height adjustment controller 64 may be programmed, configured, or operable to perform the functions and operations discussed herein through hardware, software, firmware, or combinations thereof. The height adjustment controller 64 receives electronic signals from the sensors and switches that provide information about the current height of the frame 12 and its tilt angle. The height adjustment controller 64 generates, transmits, or outputs electronic signals to the first and second height adjustment assemblies 26, 28. More specifically, the height adjustment controller 64 generates a first electronic signal to the third drive motor 50 (of the first height adjustment assembly 26) and a second electronic signal to the fourth drive motor 54 (of the second height adjustment assembly 28). The first and second electronic signals may include analog electric voltage or current levels or digital data that are received by the motor control circuitry (VFD) for each of the third and fourth drive motors 50, 54. The first and second electronic signals may instruct, energize, or control the third and fourth drive motors 50, 54 to rotate either in a first direction to raise the first and/or second sides of the frame 12 or in a second, opposing direction to lower the first and/or second sides of the frame 12.

The mobile tower 10 may operate as follows. At the start of an irrigation cycle, during an idle time, or when not in another mode, the frame 12 of the mobile tower 10 may be in a home position, that is a height that is in between the upper and lower limits of travel. The home position may be a height that is the average of the heights for irrigation of the shortest crop to be irrigated and the tallest crop to be irrigated. In addition, the value of the home position height may be selectable, or entered, by a user (farmer or technician). While the mobile tower 10 is in motion, it may encounter hills, peaks, or valleys that change the tilt angle of the frame 12. The height adjustment controller 64 may be regularly, periodically receiving information regarding the tilt angle. The height adjustment controller 64 may compare the tilt angle to a threshold range of values, and if the tilt angle is outside of the threshold range, then the height adjustment controller 64 may generate, or adjust, the first and second electronic signals to instruct, energize, or control the third and fourth drive motors 50, 54 to rotate as necessary to bring the tilt angle back to within the threshold range. For example, the threshold range of tilt angle values may be from −5 degrees to +5 degrees—wherein a tilt angle of the frame 12 within that range is acceptable.

In some embodiments, the height adjustment controller 64 may generate, or adjust, the first and second electronic signals to instruct, energize, or control the third and fourth drive motors 50, 54 to rotate as necessary to increase the height of the frame 12, and preserve an acceptable tilt angle, during the growing season to maintain an optimal distance above the crops based on historical growth data. In other embodiments, the irrigation system 100 may include sensors, such as along each span 106A, 106B, 106C, that detect the height of the crops. These sensors may generate, transmit, or output electronic signals which vary according to the height of the crops that are received by the height adjustment controller 64 for each mobile tower 10. The height adjustment controller 64 may generate, or adjust, the first and second electronic signals to instruct, energize, or control the third and fourth drive motors 50, 54 to rotate as necessary to increase the height of the frame 12 to maintain an optimal distance above the crops based on sensor data.

In various embodiments, the height adjustment controller 64 may receive data regarding local wind speed from wind speed sensors or external weather tracking services. If the wind speed is above a threshold value, then the height adjustment controller 64 may generate, or adjust, the first and second electronic signals to instruct, energize, or control the third and fourth drive motors 50, 54 to rotate as necessary to lower or reduce the height of the frame 12 to the lower limit of travel for the frame 12. The main controller 64 for the irrigation system 100 may also stop all of the drive motors 22, 24 which propel the mobile towers 10.

In various embodiments, the height adjustment controller 64 may receive also data or commands from external electronic devices or systems which provide manual adjustment of the height or tilt angle of the frame 12.

Other implementations of components of the mobile tower 10 fall under the scope of the current invention. For example, the first and second spindles 14, 16 may each include an outer spindle and an inner spindle. The outer spindle may be hollow with either four side walls connected to one another and having a square or rectangular shape or a single circular or oval side wall. The inner spindle may be positioned within the outer spindle and may move axially, or telescopically, in or out of the outer spindle. The frame 12 may be connected to the inner spindle of each of the first and second spindles 14, 16, so that motion of the inner spindle into the outer spindle lowers the frame 12 and motion of the inner spindle out from the outer spindle raises the frame 12.

As another example, the first and second height adjustment assemblies 26, 28 may each include an actuating mechanism, such as a hydraulic or a pneumatic actuator. One actuator may be integrated with the outer and inner spindles of each of the first and second spindles 14, 16. The actuator may provide the motion of the inner spindle in or out of the outer spindle.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A mobile tower for use with an irrigation system, the mobile tower comprising:
    a frame configured to support a fluid-carrying conduit of the irrigation system;
    first and second spindles, each spindle including a generally upright beam;
    a first height adjustment assembly rigidly connected to a first side of the frame and movably coupled to the first spindle, the first height adjustment assembly including a first mechanism configured to raise or lower the first side of the frame relative to the first spindle; and
    a second height adjustment assembly rigidly connected to a second side of the frame and movably coupled to the second spindle, the second height adjustment assembly including a second mechanism configured to raise or lower the second side of the frame relative to the second spindle.

2. The mobile tower of claim 1, further comprising
a first wheel connected to a lower end of the first spindle;
a second wheel connected to a lower end of the second spindle, the first and second wheels configured to propel the mobile tower;
a first drive motor configured to rotate the first wheel; and
a second drive motor configured to rotate the second wheel.

3. The mobile tower of claim 1, wherein the first and second spindles each include a first side wall with a plurality of interlocking elements distributed along a length of the first side wall.

4. The mobile tower of claim 3, wherein
the first and second spindles each further include second, third, and fourth side walls connected to one another to form a quadrilateral cross-sectional shape and the second and fourth side walls each include a lengthwise groove, and
the mobile tower further comprises
a first roller cage connected to a lower end of the first side of the frame, the first roller cage including a first roller positioned in the groove of the second side wall of the first spindle and a second roller positioned in the groove of the fourth side wall of the first spindle,
a second roller cage connected to an upper end of the first side of the frame, the second roller cage including a first roller positioned in the groove of the second side wall of the first spindle and a second roller positioned in the groove of the fourth side wall of the first spindle,
a third roller cage connected to a lower end of the second side of the frame, the third roller cage including a first roller positioned in the groove of the second side wall of the second spindle and a second roller positioned in the groove of the fourth side wall of the second spindle, and
a fourth roller cage connected to an upper end of the second side of the frame, the fourth roller cage including a first roller positioned in the groove of the second side wall of the second spindle and a second roller positioned in the groove of the fourth side wall of the second spindle.

5. The mobile tower of claim 3, wherein the interlocking elements include an unlooped chain with a first end of the chain attached near the bottom of the spindle and a second, opposing end attached near the top of the spindle.

6. The mobile tower of claim 1, wherein the first and second height adjustment assemblies each include a drive motor and a sprocket with a plurality of circumferentially-distributed teeth such that the drive motor is coupled to the sprocket to rotate it in one of two directions.

7. The mobile tower of claim 5, wherein
rotation of the sprocket of the first height adjustment assembly in a first direction raises the first side of the frame relative to the first spindle and rotation in a second, opposing direction lowers first side of the frame relative to the first spindle, and
rotation of the sprocket of the second height adjustment assembly in a first direction raises the second side of the frame relative to the second spindle and rotation in a second, opposing direction lowers second side of the frame relative to the second spindle.

8. The mobile tower of claim 5, wherein one or more teeth of the sprocket of each height adjustment assembly engage and latch with one or more of the interlocking elements of a respective spindle.

9. A mobile tower for use with an irrigation system, the mobile tower comprising:
a frame configured to support a fluid-carrying conduit of the irrigation system;
first and second spindles, each spindle including a generally upright beam;
a first height adjustment assembly rigidly connected to a first side of the frame and movably coupled to the first spindle, the first height adjustment assembly including a first mechanism configured to raise or lower the first side of the frame relative to the first spindle;
a second height adjustment assembly rigidly connected to a second side of the frame and movably coupled to the second spindle, the second height adjustment assembly including a second mechanism configured to raise or lower the second side of the frame relative to the second spindle; and
a controller programmed or configured to
receive sensor data that indicates a tilt angle of the frame, and
control the first and second height assemblies to raise or lower the first or second sides of the frame to maintain the tilt angle to be within a range of values.

10. The mobile tower of claim 9, further comprising
a first wheel connected to a lower end of the first spindle;
a second wheel connected to a lower end of the second spindle, the first and second wheels configured to propel the mobile tower;
a first drive motor configured to rotate the first wheel; and
a second drive motor configured to rotate the second wheel.

11. The mobile tower of claim 9, wherein the first and second spindles each include a first side wall with a plurality of interlocking elements distributed along a length of the first side wall.

12. The mobile tower of claim 11, wherein
the first and second spindles each further include second, third, and fourth side walls connected to one another to form a quadrilateral cross-sectional shape and the second and fourth side walls each include a lengthwise groove, and
the mobile tower further comprises
a first roller cage connected to a lower end of the first side of the frame, the first roller cage including a first roller positioned in the groove of the second side wall of the first spindle and a second roller positioned in the groove of the fourth side wall of the first spindle,
a second roller cage connected to an upper end of the first side of the frame, the second roller cage including a first roller positioned in the groove of the second side wall of the first spindle and a second roller positioned in the groove of the fourth side wall of the first spindle,
a third roller cage connected to a lower end of the second side of the frame, the third roller cage including a first roller positioned in the groove of the second side wall of the second spindle and a second roller positioned in the groove of the fourth side wall of the second spindle, and
a fourth roller cage connected to an upper end of the second side of the frame, the fourth roller cage including a first roller positioned in the groove of the second side wall of the second spindle and a second roller positioned in the groove of the fourth side wall of the second spindle.

13. The mobile tower of claim 11, wherein the interlocking elements include an unlooped chain with a first end of the chain attached near the bottom of the spindle and a second, opposing end attached near the top of the spindle.

14. The mobile tower of claim 9, wherein the first and second height adjustment assemblies each include a drive motor and a sprocket with a plurality of circumferentially-distributed teeth such that the drive motor is coupled to the sprocket to rotate it in one of two directions.

15. The mobile tower of claim 14, wherein
rotation of the sprocket of the first height adjustment assembly in a first direction raises the first side of the frame relative to the first spindle and rotation in a second, opposing direction lowers first side of the frame relative to the first spindle, and
rotation of the sprocket of the second height adjustment assembly in a first direction raises the second side of the frame relative to the second spindle and rotation in a second, opposing direction lowers second side of the frame relative to the second spindle.

16. The mobile tower of claim 14, wherein one or more teeth of the sprocket of each height adjustment assembly engage and latch with one or more of the interlocking elements of a respective spindle.

17. An irrigation system comprising:
a central pivot including a support structure;
a fluid-carrying conduit supported by the central pivot and coupled to a fluid source; and
a plurality of interconnected spans extending radially outward from the pivot, each span including
a plurality of fluid distribution members coupled to the conduit and configured to distribute fluid,
a truss structure supporting the conduit and the fluid distribution members, and
a mobile tower connected to the truss structure and supporting the conduit, the mobile tower including
a frame supporting the conduit,
first and second spindles, each spindle including a generally upright beam,
a first height adjustment assembly rigidly connected to a first side of the frame and movably coupled to the first spindle, the first height adjustment assembly including a first mechanism configured to raise or lower the first side of the frame relative to the first spindle, and
a second height adjustment assembly rigidly connected to a second side of the frame and movably coupled to the second spindle, the second height adjustment assembly including a second mechanism configured to raise or lower the second side of the frame relative to the second spindle.

18. The irrigation system of claim 17, wherein
the first and second spindles each further include first, second, third, and fourth side walls connected to one another to form a quadrilateral cross-sectional shape, the first side wall includes a plurality of interlocking elements distributed along a length of the first side wall, and the second and fourth side walls each include a lengthwise groove, and
the mobile tower further comprises
a first roller cage connected to a lower end of the first side of the frame, the first roller cage including a first roller positioned in the groove of the second side wall of the first spindle and a second roller positioned in the groove of the fourth side wall of the first spindle,
a second roller cage connected to an upper end of the first side of the frame, the second roller cage including a first roller positioned in the groove of the second side wall of the first spindle and a second roller positioned in the groove of the fourth side wall of the first spindle,
a third roller cage connected to a lower end of the second side of the frame, the third roller cage including a first roller positioned in the groove of the second side wall of the second spindle and a second roller positioned in the groove of the fourth side wall of the second spindle, and
a fourth roller cage connected to an upper end of the second side of the frame, the fourth roller cage including a first roller positioned in the groove of the second side wall of the second spindle and a second roller positioned in the groove of the fourth side wall of the second spindle.

19. The irrigation system of claim 17, wherein the first and second height adjustment assemblies each include a drive motor and a sprocket with a plurality of circumferentially-distributed teeth such that the drive motor is coupled to the sprocket to rotate it in one of two directions.

20. The irrigation system of claim 19, wherein
rotation of the sprocket of the first height adjustment assembly in a first direction raises the first side of the frame relative to the first spindle and rotation in a second, opposing direction lowers first side of the frame relative to the first spindle, and
rotation of the sprocket of the second height adjustment assembly in a first direction raises the second side of the frame relative to the second spindle and rotation in a second, opposing direction lowers second side of the frame relative to the second spindle.

* * * * *